(12) United States Patent
Riccardi et al.

(10) Patent No.: US 7,194,462 B2
(45) Date of Patent: *Mar. 20, 2007

(54) SYSTEMS AND METHODS FOR IMPLEMENTING AN XML QUERY LANGUAGE

(75) Inventors: Fabio Riccardi, Palo Alto, CA (US); Paul J. Lucas, Mountain View, CA (US); Daniela D. Florescu, Palo Alto, CA (US); Donald Alan Kossmann, Zurich (CH); Till Casten Westmann, Munich (DE); Christopher James Hillery, Vacaville, CA (US)

(73) Assignee: Bea Systems, Inc., San Jose, CA (US)

( * ) Notice: Subject to any disclaimer, the term of this patent is extended or adjusted under 35 U.S.C. 154(b) by 461 days.

This patent is subject to a terminal disclaimer.

(21) Appl. No.: 10/787,714

(22) Filed: Feb. 26, 2004

(65) Prior Publication Data

US 2005/0131875 A1    Jun. 16, 2005

Related U.S. Application Data

(60) Provisional application No. 60/450,381, filed on Feb. 27, 2003.

(51) Int. Cl.
*G06F 17/00* (2006.01)
(52) U.S. Cl. ........................................... 707/4
(58) Field of Classification Search .................. 707/2, 707/3, 100, 102, 104.1, 4; 715/513
See application file for complete search history.

(56) References Cited

U.S. PATENT DOCUMENTS 6,366,934 B1   4/2002   Cheng et al. ............... 715/513

6,654,734 B1   11/2003   Mani et al. ..................... 707/2

OTHER PUBLICATIONS

Uche Okpara et al., XP: A Simple XQuery Processor Implemented in Java, Dec. 18, 2002, pp. 1-6.*

* cited by examiner

*Primary Examiner*—Apu M. Mofiz
(74) *Attorney, Agent, or Firm*—Fliesler Meyer LLP

(57) ABSTRACT

Systems and methods in accordance with the present invention provide for an implementation of the XQuery standard, and such an implementation will be referred to herein as an XQuery (XML Query language) implementation. An XQuery implementation can be based on a token stream representation, which allows large XML documents to be processed without having to first read the entire document. An XQuery implementation can also utilize a streaming XQuery engine. A set of algorithms and a set of rewrite rules can be used for the implementation. Given a query, a set of rules can be applied to that query to transform the query into another query. Some of these rules allow the resulting query to be streamable. In other words, a query that would otherwise require an XML document to be read into memory can now be transformed into a query that can work on an XML stream. The type system of the XQuery language can be based on XML Schema, and the basic types of XML Schema can have derived types. The XQuery programs can execute in a context comprising of variable bindings, namespaces, operators, default parameters, etc. This description is not intended to be a complete description of, or limit the scope of, the invention. Other features, aspects, and objects of the invention can be obtained from a review of the specification, the figures, and the claims.

39 Claims, 1 Drawing Sheet

SYSTEMS AND METHODS FOR IMPLEMENTING AN XML QUERY LANGUAGE

CLAIM OF PRIORITY

This application claims priority to U.S. Provisional Patent Application No. 60/450,381 filed Feb. 27, 2003, entitled "SYSTEMS AND METHODS FOR IMPLEMENTING AN XML QUERY LANGUAGE" which is hereby incorporated herein by reference.

COPYRIGHT NOTICE

A portion of the disclosure of this patent document contains material which is subject to copyright protection. The copyright owner has no objection to the facsimile reproduction by anyone of the patent document of or the patent disclosure, as it appears in the Patent and Trademark Office patent file or records, but otherwise reserves all copyright rights whatsoever.

FIELD OF THE INVENTION

The present invention relates to the querying of XML data.

BACKGROUND

XQuery is a standard query language for XML documents, published by the W3C (World Wide Web Consortium) to define query requests and handle query results. XQuery is designed to be an efficient language in which queries are concise and easily understood.

The XQuery language is derived from various sources, including SQL. It even provides a For-Let-Where-Return (FLWR—pronounced "flower") expression. Developers familiar with SQL will find XQuery very easy to learn.

DETAILED DESCRIPTION

Figure 1:
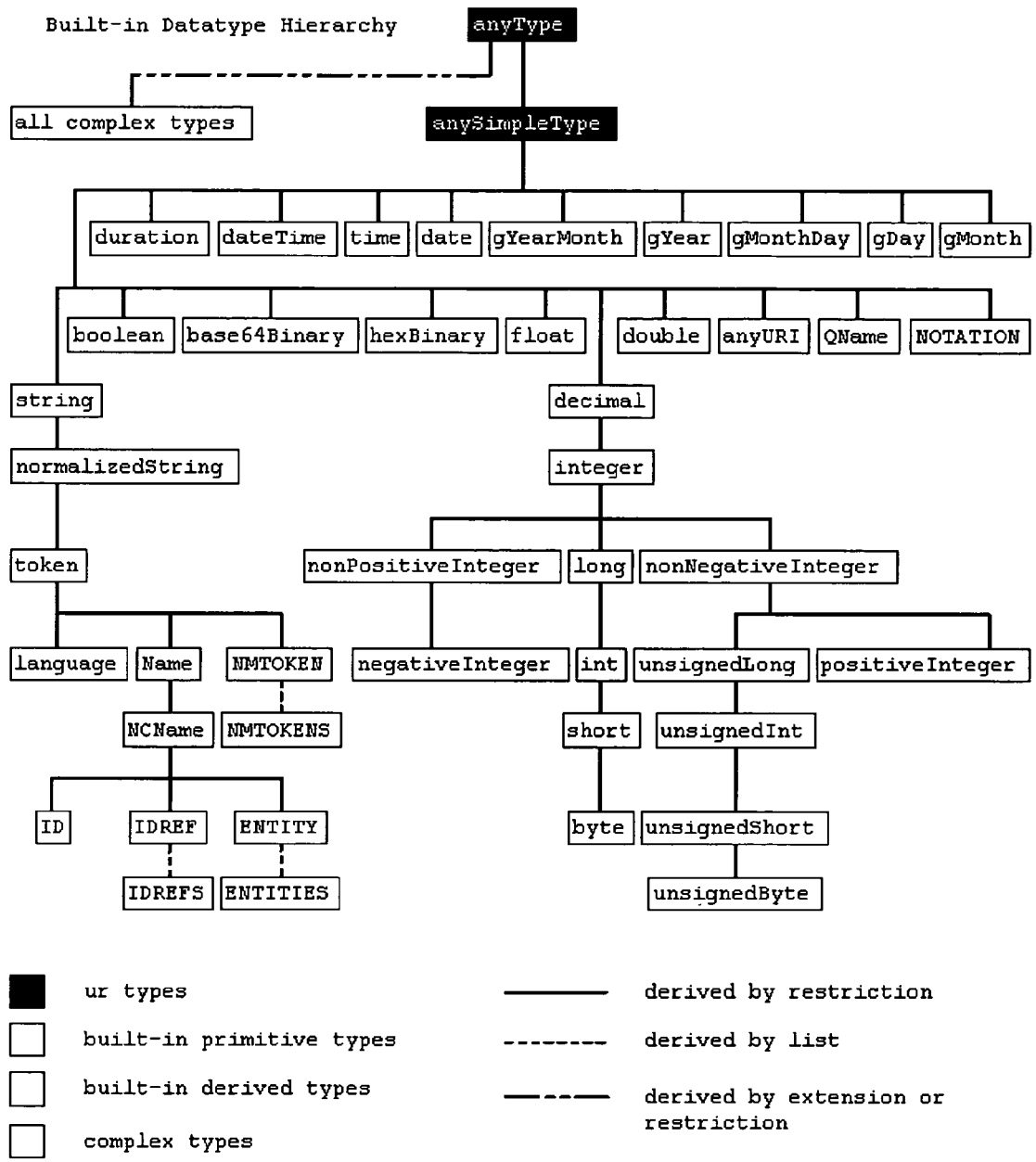
FIG. 1 is a diagram of exemplary datatype hierarchy showing complex data types directly by their structure, eventually reducing to a structured composition of simple types and their derivatives.

Systems and methods in accordance with the present invention provide for an implementation of the XQuery standard, and such an implementation will be referred to herein as an XQuery (XML Query language) implementation. An XQuery implementation can be based on a token stream representation, which allows large XML documents to be processed without having to first read the entire document. A set of algorithms and a set of rewrite rules can be used for the implementation. Given a query, a set of rules can be applied to that query to transform the query into another query. Some of these rules can allow the resulting query to be streamable. In other words, a standard query that would otherwise require an XML document to be read into memory, can now be transformed into a query that can work on an XML stream.

In many cases, such a transformation can be applied to a query such that the entire query process is streamable. For example, a user could generate a query where data is to be sorted in a particular order. Later, that query might be used in a larger context where the order is not important. An XQuery implementation can analyze the query and can determine that it would be an unnecessary use of resources to sort the result later. Sorting typically requires all the data to be read into memory and stored until all elements are known. If the sorting step is eliminated from the later query, it is possible to simply process the XML on an XML stream.

A user or developer can add extensions or annotations to the XQuery language in order to address certain aspects that are not yet covered in the draft standard. A graphical user interface can be used with an XQRL implementation that allows a user to build data transformations.

Token Stream

A token stream (TS) is an XML representation that can be used throughout an XQuery language implementation. A token stream can be compact and efficient. The tokenized format can represent the structure of an XML document with a minimal memory footprint even in the presence of repetitive elements. Although a token stream can be designed for the internal data representation of a processor, the stream can also be used for application interchange. A token stream can be used to easily manage XML fragments and is easily serializable on both network and disk. If an application uses XQuery as a principal means for XML processing, intermediate results may be directly available for data processing.

An XQuery processor, such as XQuery, can process XML data in a streaming fashion. A data transformation operation, or query, in XQuery can be decomposed into a series of successive elementary operations on the data itself. Accordingly, an XQuery expression can be transformed by the XQuery processor into a sequence of elementary operators, with each operation applying a transformation on its input and feeding its output to the next operator.

Accordingly, instead of completely consuming input before performing the transformation, each operator can consume a minimal amount of input and can immediately begin to produce results, that can be directly available to the next operator.

Using such an approach, an operator may not need to buffer large amounts of data thereby reducing memory consumption. Also, the result of such a query can be made available as soon as possible, often well before the in put data has been completely consumed.

A streaming implementation can be consumer directed, such as using a 'pull' mode. A consumer of the result of the query can demand data tokens from the last operator composing the query. The last operator can, in turn, ask for data from the previous operators, and so on, up to the input source.

As indicated above, to make such a flow of data possible, the data can be represented in a format that is granular enough for this processing, such as the token stream. As the name implies, a token stream is a tokenized representation of an XML data fragment. Repeating structural elements can be replaced by tokens, which can retain the semantics of the original data element, discarding unnecessary information accompanying those elements.

The XQuery processor can be implemented in the Java programming language, which can have tokens represented by objects. Repeating elements in the stream can be repetitions of the same pointer to a single object.

Tokens in a token stream can be immutable objects. Data transformations can be performed on the same input tokens coming from an XML parser or tokenizer. The output of the query can be made of the same exact tokens as the input, and possibly some generated by element constructors. Such an approach can keep the rate of object creation to a minimum during the different phases of data transformation.

For example, consider the following XML data fragment:

Schema:

```
<xsd:complexType name="vote">
   <xsd:simpleContent>
      <xsd:extension base="xsd:float">
         <xsd:attribute name="index" type="xsd:int"/>
      </xsd:extension>
   </xsd:simpleContent>
</xsd:complexType>
<xsd:element name="judgement" type="vote"/>
```

Data Instance:

```
<judgement index="11">43.5</judgement>
```

The tokenizer and the schema validator can transform the previous data fragment in the following sequence of tokens:

```
[Begin Element]
QName : [judgement@http://www.xqrl.com/example1]
QName : [vote@http://www.xqrl.com/example1]
[Begin Attribute]
QName : [index]
QName : [int@http://www.w3.org/2001/XMLSchema]
int : 11
[End Attribute]
[Begin Text]
CharData : "43.5"
[End Text]
float : 43.5
[End Element]
```

In the example, the first token [Begin Element] marks the beginning of the element judgment. Following is a QName token indicating the fully qualified name for the element, and another QName specifying the type of the element as it is defined in the schema. [Begin Attribute] marks the beginning of the attribute, following the QName with its name and type. A typed value token (represented by int: 11) gives the value of the attribute as an integer. [End Attribute] marks the end of the attribute.

According to the XQuery Specification, the original lexical representation for each element should be available for processing, thereby the [Begin Text] CharData "43.5" [End Text] tokens, followed by the value token carrying the typed float representation of the element's data float:43.5 and finally the [EndElement] token marks the end of the element judgment.

The type system of the XQuery language can be based on XML Schema. XML Schema has a number of built-in basic types (elements in the FIG. 1 below: duration, dateTime, time, date, gYearMonth, gYear, gMonthDay, gDay, gMonth, Boolean, base64Binary, hexBinary, float, double, anyURI, QName, NOTATION, string, decimal) that exist as typed tokens in the Token Stream representation. Each basic type can have derived types, that are represented by typed tokens inheriting from the base type and having an additional field specifying the name of the derived type. The physical data representation and the default behavior is instead shared with the parent, the derivation being essentially a restriction of the parent type.

As seen in the previous example, complex data types can be represented directly by their structure, eventually reducing to a structured composition of simple types and their derivatives. An exemplary datatype hierarchy is given by FIG. 1.

A second example shows an entire XML document and its tokenized representation. In the token stream the [Begin Document] and [End Document] tokens can be seen, as well as the name space declarations and a few additional data types.

The Schema:

```
<?xml version="1.0" encoding="UTF-8"?>
<xsd:schema xmlns:xsd='http://www.w3.org/2001/XMLSchema'
      xmlns="http://www.xqrl.com/example1"
      targetNamespace="http://www.xqrl.com/example1"
      elementFormDefault="qualified" >
   <xsd:complexType name="rootType">
      <xsd:sequence>
         <xsd:element name="judgement" type="vote"
                              minOccurs="1" maxOccurs="5"/>
      </xsd:sequence>
   </xsd:complexType>
   <xsd:complexType name="vote">
      <xsd:simpleContent>
         <xsd:extension base="grade">
            <xsd:attribute name="index"
                              type="xsd:int" default="0"/>
         </xsd:extension>
      </xsd:simpleContent>
   </xsd:complexType>
   <xsd:simpleType name="grade">
      <xsd:union>
         <xsd:simpleType>
            <xsd:restriction base="xsd:date"/>
         </xsd:simpleType>
         <xsd:simpleType>
            <xsd:restriction base="xsd:int"/>
         </xsd:simpleType>
         <xsd:simpleType>
            <xsd:restriction base="xsd:float"/>
         </xsd:simpleType>
         <xsd:simpleType>
            <xsd:restriction base="xsd:double"/>
         </xsd:simpleType>
         <xsd:simpleType>
            <xsd:restriction base="xsd:string"/>
         </xsd:simpleType>
      </xsd:union>
   </xsd:simpleType>
   <xsd:element name="root" type="rootType"/>
</xsd:schema>
```

A Data Instance:

```
<?xml version="1.0" encoding="UTF-8"?>
<root xmlns="http://www.xqrl.com/example1"
      xmlns:xsi="http://www.w3.org/2001/XMLSchema-instance"
   xsi:schemaLocation="http://www.xqrl.com/example1
tests/schema/example1.xsd" >
   <judgement index="11">43.5</judgement>
   <judgement>3.14</judgement>
   <judgement>pizza</judgement>
   <judgement>2002-06-14</judgement>
</root>
```

The Token Stream:

```
[Begin Document]
[Begin Element]
QName : [root@http://www.xqrl.com/example1]
QName : [rootType@http://www.xqrl.com/example1]
[Begin Namespace]
QName : [@http://www.xqrl.com/example1]
[End Namespace]
[Begin Namespace]
QName : [xsi@http://www.w3.org/2001/XMLSchema-instance]
[End Namespace]
[Begin Attribute]
QName : [scemaLocation@http://www.w3.org/2001/XMLSchema-instance]
QName : [anySimpleType@http://www.w3.org/2001/XMLSchema]
CharData : "http://www.xqrl.com/example1 tests/schema/example1.xsd"
[End Attribute]
[Begin Text]
CharData : "\n\n "
[End Text]
[Begin Element]
QName : [judgement@http://www.xqrl.com/example1]
QName : [vote@http://www.xqrl.com/example1]
[Begin Attribute]
QName : [index]
QName : [int@http://www.w3.org/2001/XMLSchema]
int : 11
[End Attribute]
[Begin Text]
CharData : "43.5"
[End Text]
float : 43.5
[End Element]
[Begin Text]
CharData : "\n "
[End Text]
[Begin Element]
QName : [judgement@http://www.xqrl.com/example1]
QName : [vote@http://www.xqrl.com/example1]
[Begin Attribute]
QName : [index]
QName : [int@http://www.w3.org/2001/XMLSchema]
int : 0
[End Attribute]
[Begin Text]
CharData : "3.14"
[End Text]
float : 3.14
[End Element]
[Begin Text]
CharData : "\n "
[End Text]
[Begin Element]
QName : [judgement@http://www.xqrl.com/example1]
QName : [vote@http://www.xqrl.com/example1]
[Begin Attribute]
QName : [index]
QName : [int@http://www.w3.org/2001/XMLSchema]
int : 0
[End Attribute]
[Begin Text]
CharData : "pizza"
[End Text]
string : pizza
[End Element]
[Begin Text]
CharData : "\n "
[End Text]
[Begin Element]
QName : [judgement@http://www.xqrl.com/example1]
QName : [vote@http://www.xqrl.com/example1]
[Begin Attribute]
QName : [index]
QName : [int@http://www.w3.org/2001/XMLSchema]
int : 0
[End Attribute]
[Begin Text]
CharData : "2002-06-14"
[End Text]
date : 2002-6-14T0:0:0.0☐
[End Element]
[Begin Text]
CharData : "\n"
[End Text]
[End Element]
[End Document]
```

Context

XQuery programs can execute in a Context. The Context can hold the variable bindings, namespaces, operators, and default parameters.

Furthermore, the Context can hold (static) references to an IDManager.

The IDManager is in charge of creating node IDs in XML documents. A type manager used by the static type inference engine and run-time type validation, and a schema manager or database of XML schemas.

The Context can be entirely defined at query compilation or preparation time and may never be modified by query execution. The compiler also resolves all the elements of the Context to direct pointer references in the compiled query. Consequently, a query execution engine may never need to resolve variables by their name at run time.

To implement the semantics of FLWR expressions, implicit variables defined in XPath expressions and order by clauses, a new Context can be created holding the newly (implicitly or explicitly) scoped variables. This new context can be linked to its parent. All variables of the parent can be accessible from the context, possibly except for those that are redefined by the new context shadowing their parent counterpart.

To factor things and to reduce start-up time, a base context can be used to hold the default environment, that can include standard namespaces, built-in functions and operators, and default behaviors.

Queries can reuse pre-initialized contexts, but they may not be able to directly modify those contexts. A new scratch context can always be created for query execution, which can inherit directly from the base context or from another explicitly-given context. Special queries can be used to pre-initialize contexts to be reutilized by subsequent queries, reducing the cost of context creation.

Given their critical nature, execution contexts may not be directly accessible to the user. Execution objects can be opaque objects embedded in Connection objects, that are provided in one embodiment by an XDBC interface.

A Connection object can be created through an interface such as a DriverManager getConnection interface, and can be used to prepare statements that are subsequently populated using a special query prologue, such as a populateContext method of Connection.

Contexts can be saved for later use associating them to a URI such as by using a publish method of a DriverManager such that other contexts can be subsequently created inheriting from the saved ones.

EXAMPLES

```
// derive a connection from the Base Context (default)
Connection c = DriverManager.getConnection( );
// populate it with someXQuery prologue
c.populateContext(prologue);
// publish it!
DriverManager.publish("www.xqrl.com/contexts/stuffed", c);
// some other time, some other place, ...
// derive a Connection from the previously saved one
Connection c = DriverManager.getConnection(
                "www.xqrl.com/contexts/stuffed",
                Connection.Type.INHERITED);
// use it to execute your favorite query!
PreparedStatement ds =
        (PreparedStatement) c.prepareStatement(dataQuery);
TokenIterator doc = ds.executeQuery( );
```

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for an implementation of XML Query language, comprising the steps of:
analyzing an XML query;
creating a token stream representation of at least one XML document required to process said XML query;
transforming said XML query into a second query that can work on said token stream representation; and,
executing said second query on said token stream representation.

2. A method according to claim 1, wherein:
said implementation is programmed in Java language.

3. A method according to claim 1, wherein:
said step of transforming includes utilizing a query engine that uses a set of algorithms and a set of rewrite rules.

4. A method according to claim 3, wherein:
said set of rewrite rules comprises rules that allow the second query to be streamable.

5. A method according to claim 1, wherein:
said implementation further allows a user to add extensions and annotations to said XML Query language.

6. A method according to claim 1, wherein:
said token stream representation is serializable.

7. A method according to claim 1, wherein:
said transforming step further comprises converting said XML query into a sequence of elementary operators, with each operator applying a transformation of the operator input and feeding the operator output to the next operator.

8. A method according to claim 1, wherein:
said token stream representation comprises tokens that are immutable objects.

9. A method according to claim 1, wherein:
said transforming step further comprises keeping the rate of object creation to a minimum during all phases of data transformation by using the exact tokens of said token stream representation for the output of said XML query.

10. A method according to claim 1, wherein:
said token stream representation comprises typed tokens, wherein each typed token specifies the type of XML element of the XML document represented.

11. A method according to claim 10, wherein:
said typed tokens have derived types, wherein said derived types share physical data representation and default behavior with said typed tokens.

12. A method according to claim 10, wherein:
said typed tokens are based on XML Schema.

13. A method according to claim 1, further comprising:
executing said XML query in a context, wherein said context is comprised of resources required for said XML query execution.

14. A method according to claim 13, wherein:
said context is defined at least in part at said XML query preparation time.

15. A method according to claim 13, wherein:
said context is defined at least in part at said XML query compilation time.

16. A method according to claim 13, wherein:
said context is saved for later use, such that a second context is subsequently created inheriting from saved said context.

17. A method according to claim 13, wherein:
said context is used to create a new context, wherein said new context inherits from said context.

18. A method according to claim 13, further comprising:
creating new context for holding the newly scoped variables defined by expressions-in said XML query.

19. A method according to claim 1, further comprising:
providing an interface for creating a connection object to execute said XML query.

20. A system for an implementation of XML Query language, comprising:
a token stream processor that can create a token stream representation of at least one XML document required to process an XML query;
a query engine that can transform said XML query into a second query that can work on said token stream representation; and
a query processorthat can execute said second query on said token stream representation.

21. A system according to claim 20, wherein:
said implementation is programmed in Java language.

22. A system according to claim 20, wherein:
said query engine uses a set of algorithms and a set of rewrite rules to transform said XML query into said second query that can work on said token stream representation.

23. A system according to claim 22, wherein:
said set of rewrite rules comprise of rules that allow the second query to be streamable.

24. A system according to claim 20, wherein:
said implementation further allows a user to add extensions and annotations to said XML Query language.

25. A system according to claim 20, wherein:
said token stream representation is serializable.

26. A system according to claim 20, wherein:
said query engine further converts said XML query into a sequence of elementary operators, with each operator applying a transformation of the operator input and feeding the operator output to next the operator.

27. A system according to claim 20, wherein:
said token stream representation comprises tokens that are immutable objects.

28. A system according to claim 20, wherein:
said query engine keeps the rate of object creation to a minimum during all phases of data transformation by using the exact tokens of said token stream for the output of said XML query.

29. A system according to claim 20, wherein:
said token stream representation comprises typed tokens, wherein each typed token specifies the type of XML element of the XML document represented.

30. A system according to claim 29, wherein:
said typed tokens have derived types, wherein said derived types share physical data representation and default behavior with said typed tokens.

31. A system according to claim 29, wherein:
said typed tokens are based on XML Schema.

32. A system according to claim 29, further comprising:
an interface for creating a connection object to execute said XML query.

33. A system according to claim 1, further comprising:
a context for executing said XML query, wherein said context is comprised of resources required for said XML query execution.

34. A system according to claim 33, wherein:
said context is defined at least in part at said XML query preparation time.

35. A system according to claim 33, wherein:
said context is defined at least in part at said XML query compilation time.

36. A system according to claim 33, wherein:
said context is saved for later use, such that a second context is subsequently created inheriting from saved said context.

37. A system according to claim 33, wherein:
said context is used to create a new context, wherein the new context inherits from said context.

38. A system according to claim 33, further comprising:
a new context for holding the newly scoped variables defined by expressions in said XML query.

39. A computer system comprising:
a processor;
object code executed by said processor, said object code configured to:
create a token stream representation of at least one XML document required for processing an XML query;
transform said XML query into a second query that can work on said token stream representation; and
execute said second query on said token stream representation.

* * * * *

UNITED STATES PATENT AND TRADEMARK OFFICE
CERTIFICATE OF CORRECTION

PATENT NO. : 7,194,462 B2
APPLICATION NO. : 10/787714
DATED : March 20, 2007
INVENTOR(S) : Riccardi et al.

It is certified that error appears in the above-identified patent and that said Letters Patent is hereby corrected as shown below:

Item (75) Inventors: delete "Casten" and insert therefor --Carsten--.

Signed and Sealed this

Sixth Day of November, 2007

JON W. DUDAS
*Director of the United States Patent and Trademark Office*